(12) United States Patent
Wu et al.

(10) Patent No.: US 12,315,895 B2
(45) Date of Patent: May 27, 2025

(54) BATTERY HAVING EXTERNAL CONNECTOR FOR BALANCE CHARGING AND DISCHARGING

(71) Applicants: ProGreens New Energy Technology Co., Ltd., Taipei (TW); Yung Chun Wu, Taoyuan (TW)

(72) Inventors: Yung Chun Wu, Taoyuan (TW); Chih Chung Tao, Taipei (TW)

(73) Assignees: Yung Chun Wu, Taoyuan (TW); PROGREENS NEW ENERGY TECHNOLOGY CO., LTD., Taipei (TW)

( * ) Notice: Subject to any disclaimer, the term of this patent is extended or adjusted under 35 U.S.C. 154(b) by 622 days.

(21) Appl. No.: 17/742,989

(22) Filed: May 12, 2022

(65) Prior Publication Data

US 2023/0006267 A1    Jan. 5, 2023

(30) Foreign Application Priority Data

Jul. 5, 2021   (TW) .................................. 110124535

(51) Int. Cl.
| | |
|---|---|
| H01M 10/42 | (2006.01) |
| H01M 10/48 | (2006.01) |
| H01M 50/172 | (2021.01) |
| H01M 50/569 | (2021.01) |
| H02J 7/00 | (2006.01) |

(52) U.S. Cl.
CPC ..... *H01M 10/4257* (2013.01); *H01M 10/482* (2013.01); *H01M 50/172* (2021.01); *H01M 50/569* (2021.01); *H02J 7/0014* (2013.01); *H01M 2010/4271* (2013.01)

(58) Field of Classification Search
CPC ............ H01M 50/569; H01M 50/172; H01M 10/482; H01M 10/4257; H01M 2010/4271
See application file for complete search history.

(56) References Cited

U.S. PATENT DOCUMENTS

| | | | |
|---|---|---|---|
| 2008/0088276 A1* | 4/2008 | Hurst ................ | H01M 10/0481 320/116 |
| 2009/0009133 A1* | 1/2009 | Tange ................. | H01M 50/569 320/132 |
| 2011/0135970 A1* | 6/2011 | Han ..................... | H01M 50/502 429/7 |

(Continued)

*Primary Examiner* — Matthew J Merkling
(74) *Attorney, Agent, or Firm* — Sinorica International Patent & Trademark

(57) ABSTRACT

A battery includes a case, in which a battery module, a battery management system and a junction terminal block are received. The battery module has cell blocks electrically connected in series, and each of the cell blocks has electrodes. The junction terminal block has a plurality of junction terminals to be electrically connected to the electrodes of the cell blocks through a plurality of junction wires respectively. The battery further has an external connector having a plurality of external terminals to be electrically connected to the junction terminals of the junction terminal block through a plurality of external wires. The external terminals of the external connector are electrically connected to the cell blocks through the external wires, the junction terminals of the junction terminal block and the junction wires respectively, so that all the cell blocks are able to be charged individually through the external connector.

16 Claims, 9 Drawing Sheets

(56) References Cited

U.S. PATENT DOCUMENTS

| | | | |
|---|---|---|---|
| 2012/0161677 A1* | 6/2012 | Kunimitsu | H01M 50/284 |
| | | | 320/134 |
| 2013/0288530 A1* | 10/2013 | Zhao | H01M 50/503 |
| | | | 439/627 |
| 2019/0221816 A1* | 7/2019 | Yanagida | H01M 50/503 |
| 2020/0119409 A1* | 4/2020 | Umemura | H02J 7/0048 |
| 2020/0403199 A1* | 12/2020 | Sakurai | H01M 50/502 |

\* cited by examiner

BATTERY HAVING EXTERNAL CONNECTOR FOR BALANCE CHARGING AND DISCHARGING

BACKGROUND OF THE INVENTION

1. Technical Field

The present invention relates to a device for monitoring and balancing voltage of cell blocks in a battery, and more particularly to an external connector, which directly connects to terminals of cells in a battery module, for balance charging and discharging of the cell blocks, and a method for balance charging and discharging the cell blocks through the external connectors.

2. Description of Related Art

Battery modules are the key component of electric vehicles, including electric cars, electric scooters etc. The main factors to evaluate a battery module include capacity, voltage, safety, and charging time. A conventional battery module includes plural cells, and a plurality of the cells are connected in parallel to form a cell block, which is the basic component of the battery module. A voltage of the cell block is the same as the voltage of each cell since the cells are connected in parallel. In practice, the properties of the cells, such as charged ability, voltage, capacity curve will be different after times of charging and discharging even though they should be the same in theory.

In modern electric vehicles, the battery thereof usually has ten or more battery modules in series or in parallel (usually is in series), each battery module has dozens of cell blocks, and each cell block has one to dozens of cells. Therefore, there may be twelve to eighteen cell blocks in the battery of an electric scooter, and two hundreds or more cell blocks in the battery of an electric bus. Take the electric bus for example, the battery may has 1,200 cells while the battery has 200 cell blocks, and each cell block has 6 cells.

The difference among the 1,200 cells will be significant when the battery of the bus is charged and discharged a lot of times. Therefore, the battery is unable to be fully charged when the charged ability of at least one of the cells decreased, and unable to discharge even when the battery still has power therein in a short time. As a result, the electric will have worse and worse cruising endurance.

To fix above problem, the battery will be checked to charge the cells with low voltage and discharge the cells with high voltage respectively.

A conventional method of charging and discharging the abnormal cells includes recording the voltages of every cell through a vehicle control unit (VCU) when the electric vehicle is running, and marking the cells with abnormal voltages (too high or too low). Next, the battery is removed from the vehicle to charge and discharge the abnormal cells by connecting a specific device to terminals of the abnormal cells. Sometime the cells are deep inside the battery and the operator is unable to reach the terminals of the cells, such cells will be charged or discharged through sampling wires of a battery management system (BMS). However, the sampling wires of BMS usually sustain a low current, so that the time of charging or discharging through the sampling wires is very long.

The conventional method of charging and discharging the abnormal cells has several drawbacks. First, usually the battery is very heavy that is very hard to remove it. Second, open the battery is harmful to the waterproof of the battery. Third, it is a hard task and takes a long time, and forth, the abnormal cells have different status, so they still will be different when they are charged or discharged in the same process.

BRIEF SUMMARY OF THE INVENTION

In view of the above, the primary objective of the present invention is to provide a device and a method, which allows the abnormal cells to be charged and discharged in an easy way.

In order to achieve the objective of the present invention, a battery includes a case, in which a battery module, a battery management system and a junction terminal block are received. The battery module has cell blocks electrically connected in series, and each of the cell blocks has electrodes. The junction terminal block has a plurality of junction terminals to be electrically connected to the electrodes of the cell blocks through a plurality of junction wires respectively. The battery further has an external connector having a plurality of external terminals to be electrically connected to the junction terminals of the junction terminal block through a plurality of external wires. The external terminals of the external connector are electrically connected to the cell blocks through the external wires, the junction terminals of the junction terminal block and the junction wires respectively, so that all the cell blocks are able to be charged individually through the external connector.

The present invention allows the cell blocks in the case to be charged independently through the external connector. User is no need to disassemble the battery, so that the charging task is easy to ensure all the cell blocks would be charged to a uniform condition to elongate the battery life.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
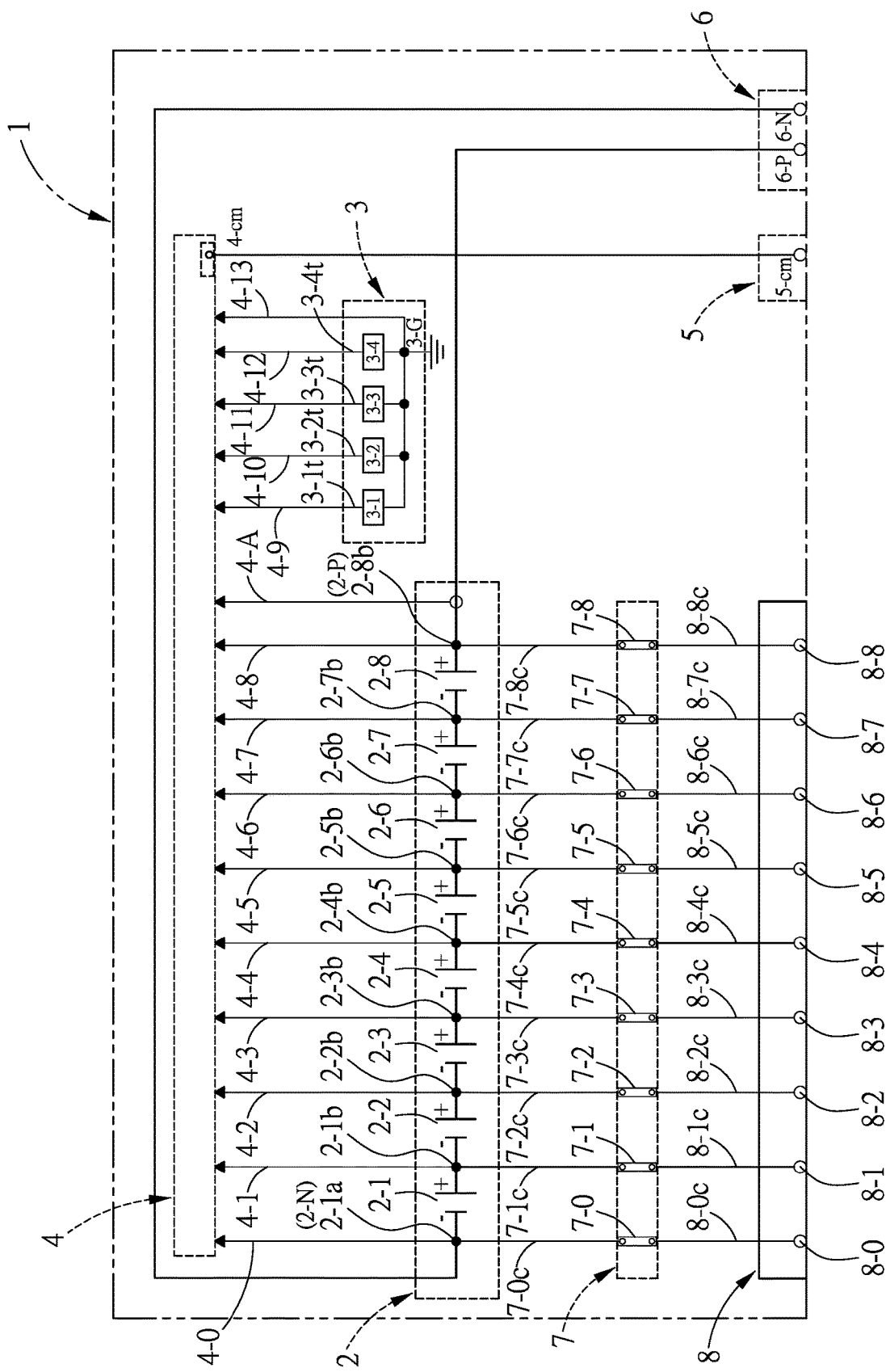
FIG. 1 is a circuit of the battery model with eight cell blocks of a preferred embodiment of the present invention.

FIG. 1 shows a circuit of a battery 1 of the preferred embodiment of the present invention, including a battery module 2, a temperature sensor module 3, a battery management system (BMS) 4, a communication connector 5, and a charging/discharging connector 6. Above elements are the same as elements in a conventional battery, so I do not describe their detail here. The present invention further includes a junction terminal block 7 and an external connector 8.

The battery module 2 includes eight cell blocks 2-1, 2-2, 2-3, 2-4, 2-5, 2-6, 2-7 and 2-8 connected in series, in which the cell block 2-1 has a negative electrode 2-1a, and the cell blocks 2-1 to 2-8 have positive electrodes 2-1b to 2-8b respectively. The battery module 2 includes a negative electrode 2-N and a positive electrode 2-P. The negative electrode 2-1a of the cell block 2-1 is the negative electrode 2-N of the battery module 2 while the positive electrode 2-8b is the positive electrode 2-P of the battery module 2.

The temperature sensor module 3 includes four temperature sensors 3-1, 3-2, 3-3, and 3-4, each of which is mounted on the battery module 2 to sense a temperature of the battery module 2 especially when the battery module 2 is charging and discharging. The temperature sensors 3-1 to 3-4 each has a testing member 3-1t, 3-2t, 3-3t, and 3-4t to test temperatures of 4 specific points of the battery module 2. The temperature sensor module 3 further has a grounding 3-G, which grounds the temperature sensors 3-1 to 3-4.

The BMS 4 has nine voltage sampling wires 4-0, 4-1, 4-2, 4-3, 4-4, 4-5, 4-6, 4-7, and 4-8, which are electrically connected to the negative electrode 2-1a, and the positive electrodes 2-1b to 2-8b respectively to sense voltages of the cell blocks 2-1 to 2-8 of the battery module 2. The BMS 4 further has a current sampling wire 4-A electrically connected to the positive electrode 2-P of the battery module 2 to sense a current of the battery module 2 when charging and discharging. The BMS 4 further has five temperature sampling wires 4-9, 4-10, 4-11, 4-12, and 4-13, which are electrically connected to the temperature sensor module 3 to receive temperature signals of the temperature sensors 3-1 to 3-4. The BMS 4 has a BMS communication port 4-cm, which has a plurality of wires, to connect to an external device (not shown) for transmission of data of the BMS 4.

The communication connector 5 has a battery communication port 5-cm, which is electrically connected to the BMS 4 to transmit data to a controller, such as VCU (not shown). The data include the charging and discharging currents of the battery module 2, the voltages of the cell blocks 2-1 to 2-8, and the temperatures sensed by the temperature sensor module 3.

The charging/discharging connector 6 includes a negative terminal 6-N and a positive terminal 6-P to be electrically connected to the negative electrode 2-N and positive electrode 2-P to be a charging/discharging port of the battery module 2.

The junction terminal block 7 has nine junction terminals 7-0, 7-1, 7-2, 7-3, 7-4, 7-5, 7-6, 7-7, and 7-8, which are electrically connected to the negative electrode 2-1a, and the positive electrodes 2-1b to 2-8b through nine junction wires 7-0c, 7-1c, 7-2c, 7-3c, 7-4c, 7-5c, 7-6c, 7-7c, and 7-8c respectively. The junction terminals 7-0 to 7-8 may be single type junction terminals (FIG. 2), or they may be dual type junction terminals (FIG. 3), or any type that can achieve the same function.

The external connector 8 includes nine external terminals 8-0, 8-1, 8-2, 8-3, 8-4, 8-5, 8-6, 8-7, and 8-8, which are electrically connected to the junction terminals 7-0 to 7-8 through nine external wires 8-0c, 8-1c, 8-2c, 8-3c, 8-4c, 8-5c, 8-6c, 8-7c, and 8-8c respectively. And then through the junction wires 7-0c to 7-8c, the external terminals 8-0 to 8-8 are electrically connected to the negative electrode 2-1a, and the positive electrodes 2-1b to 2-8b of the cell blocks 2-1 to 2-8 respectively. The external terminals 8-0 to 8-8 are dual terminals as shown in FIG. 1, and they can be any type that can achieve the same function.

The number of the junction terminals 7-0 to 7-8 and the number of the external terminals 8-0 to 8-8 are at least one more than the number of the cell blocks 2-1 to 2-8.

The junction terminals 7-0 to 7-8 and the external terminals 8-0 to 8-8 have large conductive areas to allow a large current to flow through.

The junction wires 7-0c to 7-8c and the external wires 8-0c to 8-8c have large diameter to allow a large current flowing through to benefit for a charging task, a discharging task and a powering-up task of the battery module 2. For examples, AWG15 wire (area: 1.65 mm$^2$, max. current: 10 A); or AWG12 wire (area: 3.31 mm$^2$, max. current: 20 A). The voltage sampling wires 4-0 to 4-8 of the BMS 4 usually use AWG22 wire (area: 0.362 mm$^2$, max. current: 2 A); or AWG24 wire (area: 0.205 mm$^2$, max. current: 1.2 A). In other words, the junction wires 7-0c to 7-8c and the external wires 8-0c to 8-8c are larger than the voltage sampling wires 4-0 to 4-8.

Figure 2:
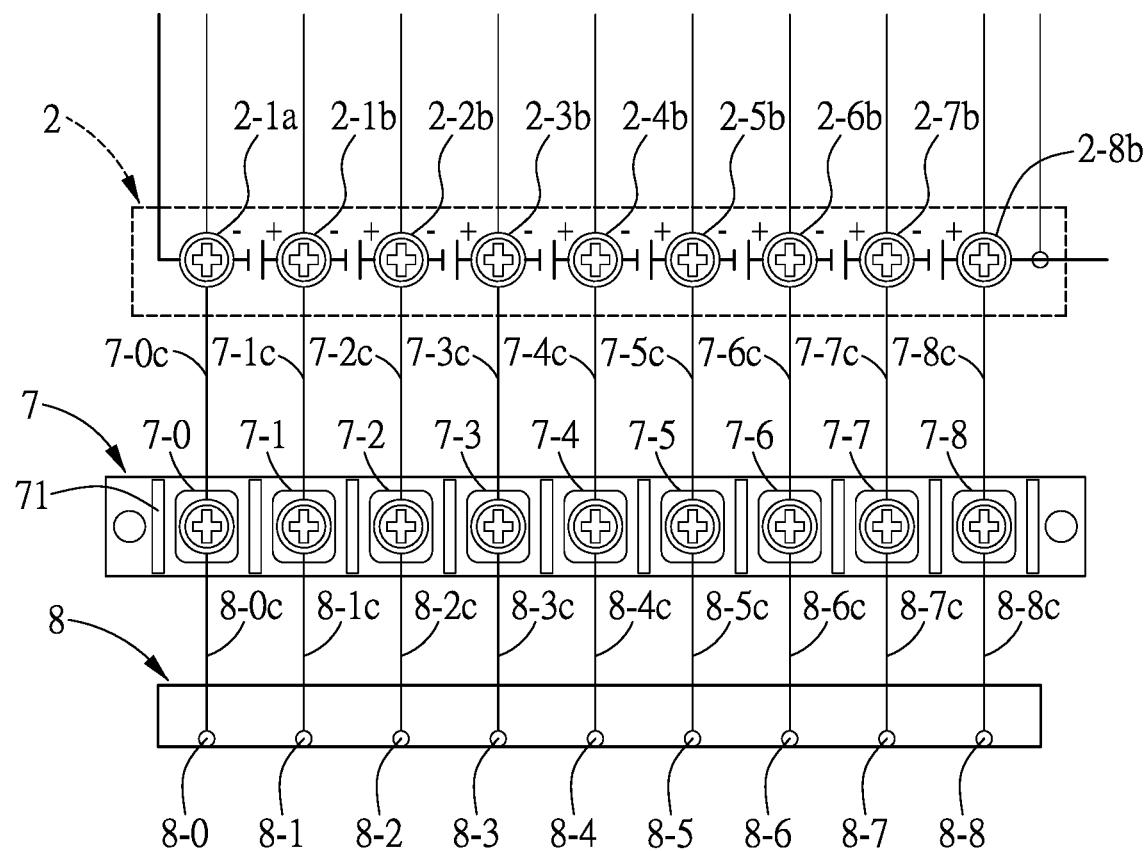
FIG. 2 is a circuit of the alternate design of the preferred embodiment of the present invention, showing the single type junction terminal block, the battery module, the and external connector of the cell blocks.

FIG. 2 shows the junction terminal block 7 is a single type junction terminal block 71. The single type junction terminal block 71 has nine fasteners (bolts or screws) and nine metallic pads (round or Y-shaped) to be the junction terminals 7-0 to 7-8. The junction wires 7-0c to 7-8c have ends fixed to the junction terminals 7-0 to 7-8 by the fasteners, and the other ends thereof are fixed to the negative electrode 2-1a, and the positive electrodes 2-1b to 2-8b of the cell blocks 2-1 to 2-8 (by bolts or by laser welding). The external wires 8-0c to 8-8c have ends fixed to the external terminals 8-0 to 8-8 usually by welding, and the other ends thereof are fixed to the junction terminals 7-0 to 7-8 by the fasteners as well.

Figure 3:
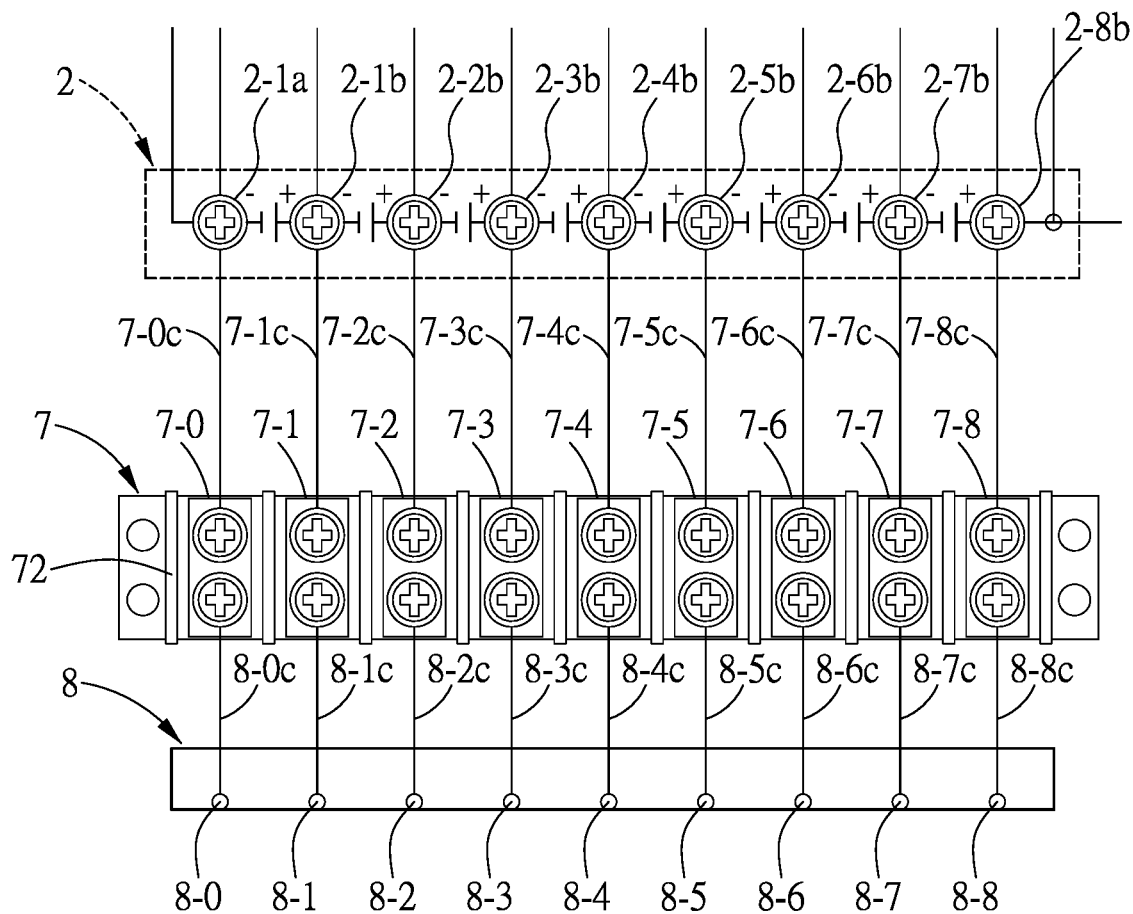
FIG. 3 is a circuit of another alternate design of the preferred embodiment of the present invention, showing the dual type junction terminal block, the battery module, and the external connector of the cell blocks.

FIG. 3 shows the junction terminal block 7 is a dual type junction terminal block 72. Each of the junction terminals 7-0 to 7-8 of the dual type junction terminal block 72 has two fasteners (bolts or screws) and a metallic pad, which electrically connects the fasteners. Similar to above the junction wires 7-0c to 7-8c have ends fixed to the junction terminals 7-0 to 7-8 by the fasteners, and the other ends thereof are fixed to the negative electrode 2-1a, and the positive electrodes 2-1b to 2-8b of the cell blocks 2-1 to 2-8 (by bolts or by laser welding). The external wires 8-0c to 8-8c have ends fixed to the external terminals 8-0 to 8-8 usually by welding, and the other ends thereof are fixed to the junction terminals 7-0 to 7-8 by the other fasteners. The metallic pads electrically connect the external wires 8-0c to 8-8c and the junction wires 7-0c to 7-8c.

Figure 4:
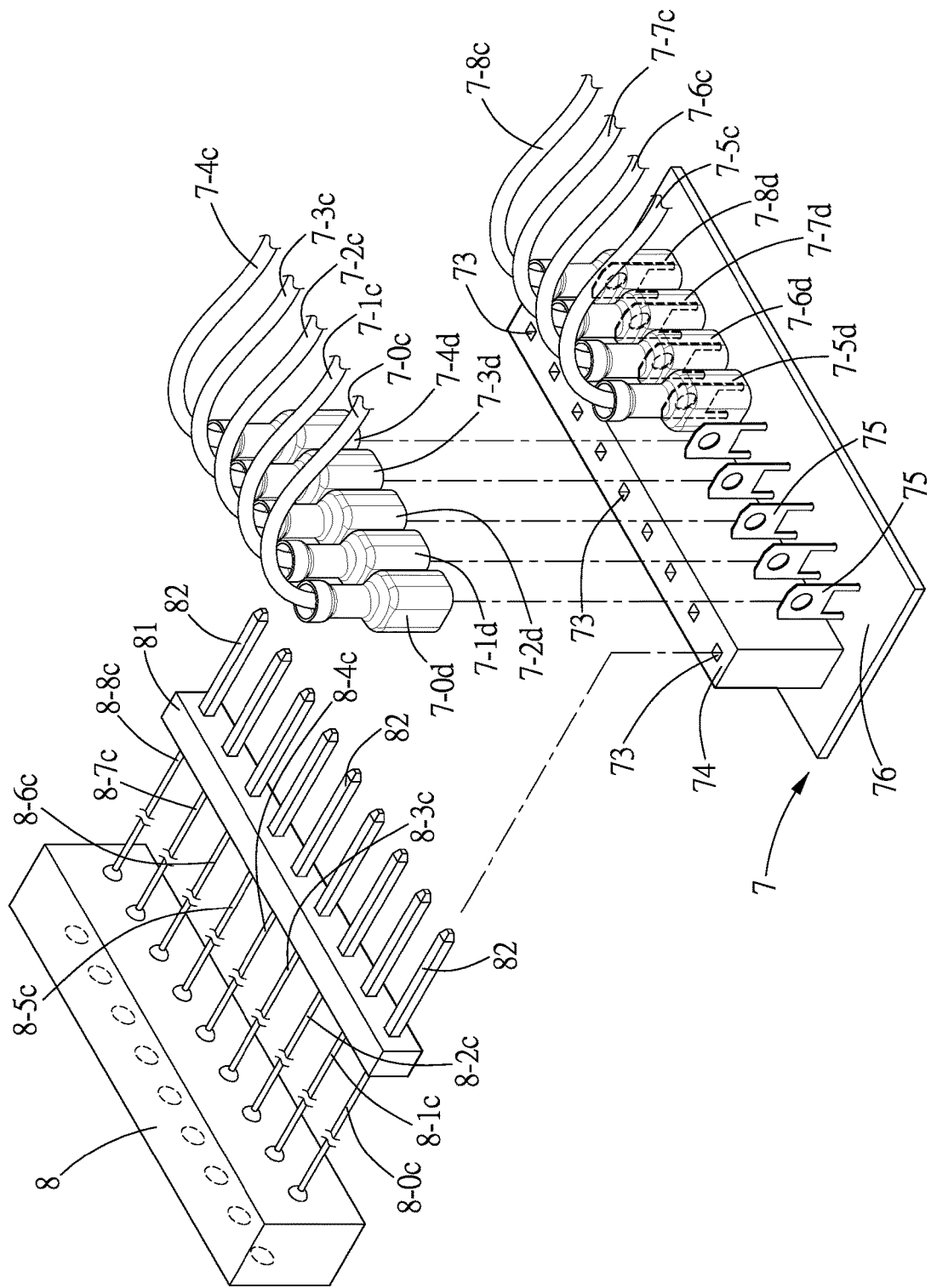
FIG. 4 is a perspective view of the preferred embodiment of the present invention, showing the circuit board type junction terminal block and the external connector of the cell blocks.

FIG. 4 shows the junction terminal block 7 having a junction terminal socket 74 and a circuit board 76. The junction terminal socket 74 has a plurality of holes 73, in each of which a conductive pad is provided. The junction terminal socket 74 is mounted on the circuit board 76, and the conductive pads are electrically connected to a circuit of the circuit board 76. A plurality of conductive plates 75 are mounted on the circuit board 76 and electrically connected to the circuit. As a result, the conductive plates 75 are electrically connected to the conductive pads of the junction terminal socket 74 through the circuit of the circuit board 76 respectively.

Each of the junction wires 7-0c to 7-8c has a coupler 7-0d, 7-1d, 7-2d, 7-3d, 7-4d, 7-5d, 7-6d, 7-7d, and 7-8d on an end thereof to be connected to the conductive plates 75 of the junction terminal block 7. The other ends of the junction wires 7-0c to 7-8c are connected to the positive electrodes 2-1b to 2-8b of the cell blocks 2-1 to 2-8 of the battery module 2 the same as described above.

The external wires 8-0c to 8-8c of the external connector 8 each has a pin plug 81 on an end thereof. Each of the pin plug 81 has at least one pin 82 to be inserted into the predetermined holes 73 of the junction terminal socket 74 and electrically connected to the conductive pads therein. As a result, the external connector 8 is electrically connected to the junction terminal block 7.

The junction terminal blocks 7 shown in FIGS. 2, 3 and 4 have the fasteners (bolts or screws) and the couplers 7-0d to 7-8d to connect the junction wires 7-0c to 7-8c instead of by welding. It provides an easy way to assemble and disassemble the junction wires 7-0c to 7-8c. The couplers 7-0d to 7-8d shown in FIG. 4 each has an insulating cover to prevent the couplers 7-0d to 7-8d from unexpectable contact when the junction wires 7-0c to 7-8c are assembled or disassembled.

The junction terminal block 7 may be an independent element mounted in the battery 1, or mounted on a circuit board of the BMS 4.

Figure 5:
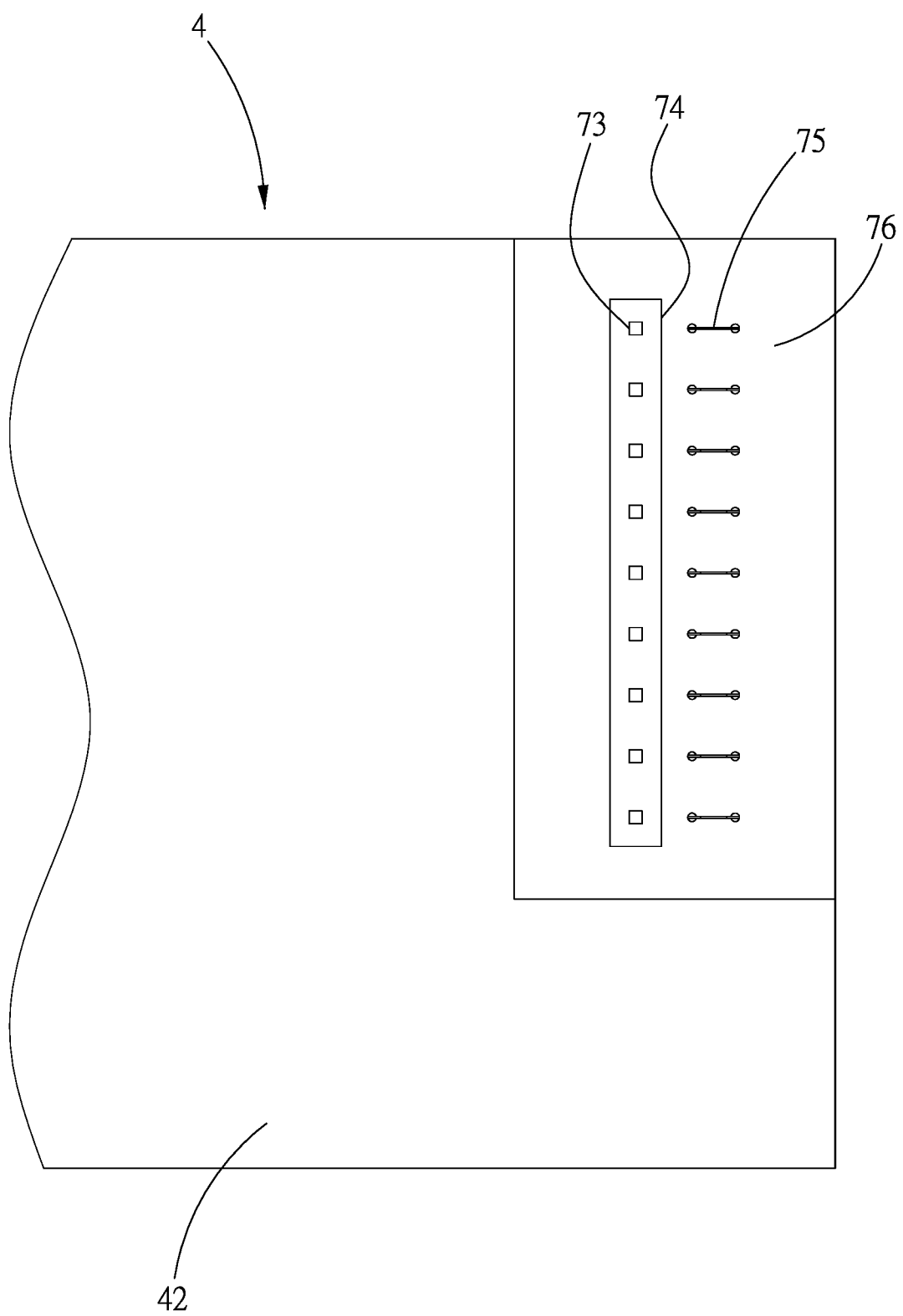
FIG. 5 is a sketch diagram of the preferred embodiment of the present invention, showing the circuit board type junction terminal block and the BMS.

FIG. 5 shows that the circuit board 76 of the junction terminal block 7 is integrated in a circuit board 42 of the BMS 4. An alternated design is that the circuit board 76 is mounted on the circuit board 42 of the BMS 4. In the present embodiment, the junction terminal socket 74 and the conductive plates 75 are made on the circuit board 42 of the BMS 4, and the circuit board 42 has the circuit of the circuit board 76 integrated in the original circuit of the circuit board 42.

Referring to FIG. 5 again, the BMS 4 samples the voltages of all the cell blocks 2-1 to 2-8 through the conductive plates 75, which are equal to the junction terminals 7-0 to 7-9. The circuit of the circuit board 42 serves the signal transmission and electrical conduction, so there is no sampling wires 4-0 to 4-8 as described above.

Figure 6:
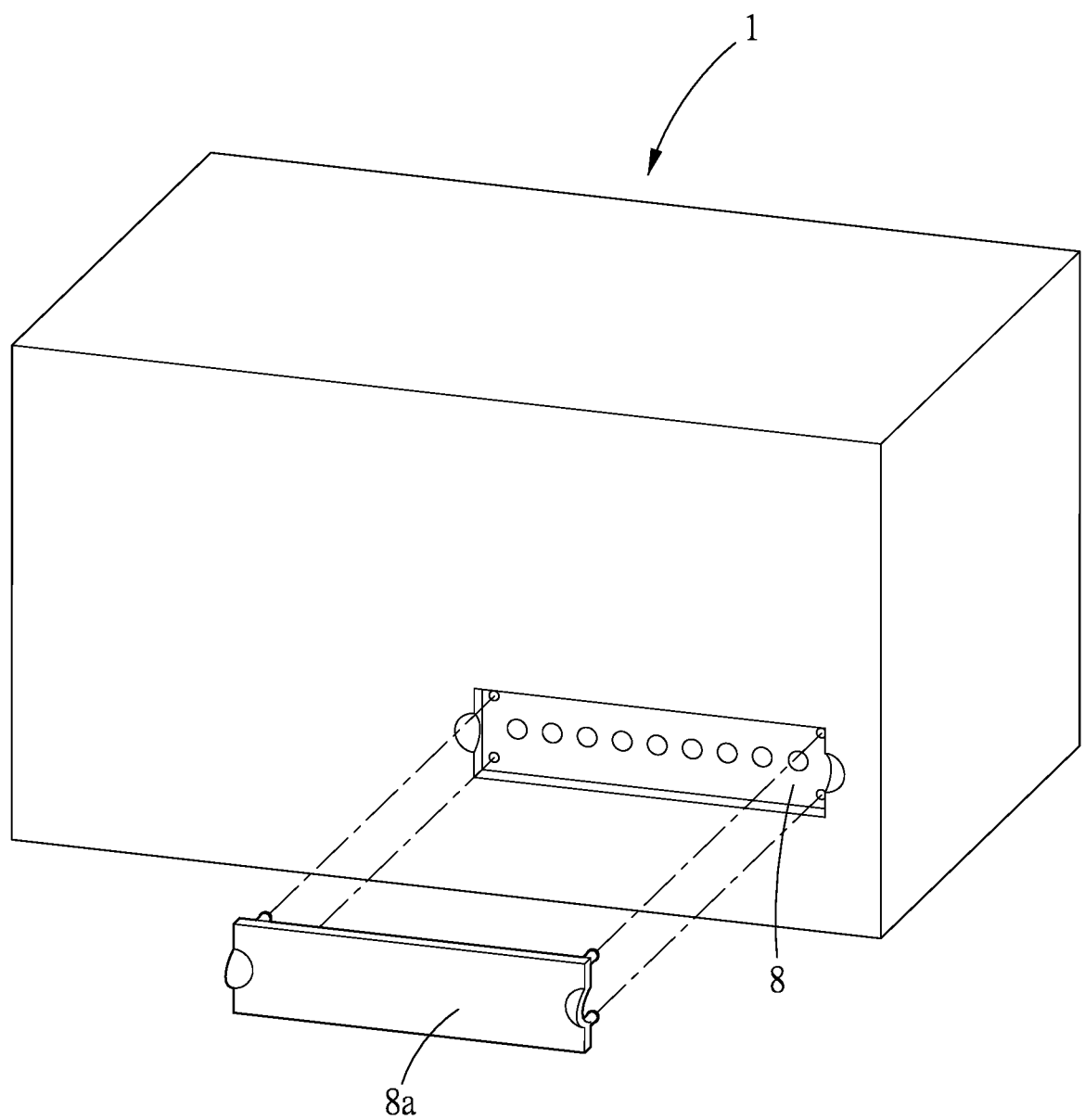
FIG. 6 is a perspective view of the preferred embodiment of the present invention, showing the external connector on the case.
Figure 7:
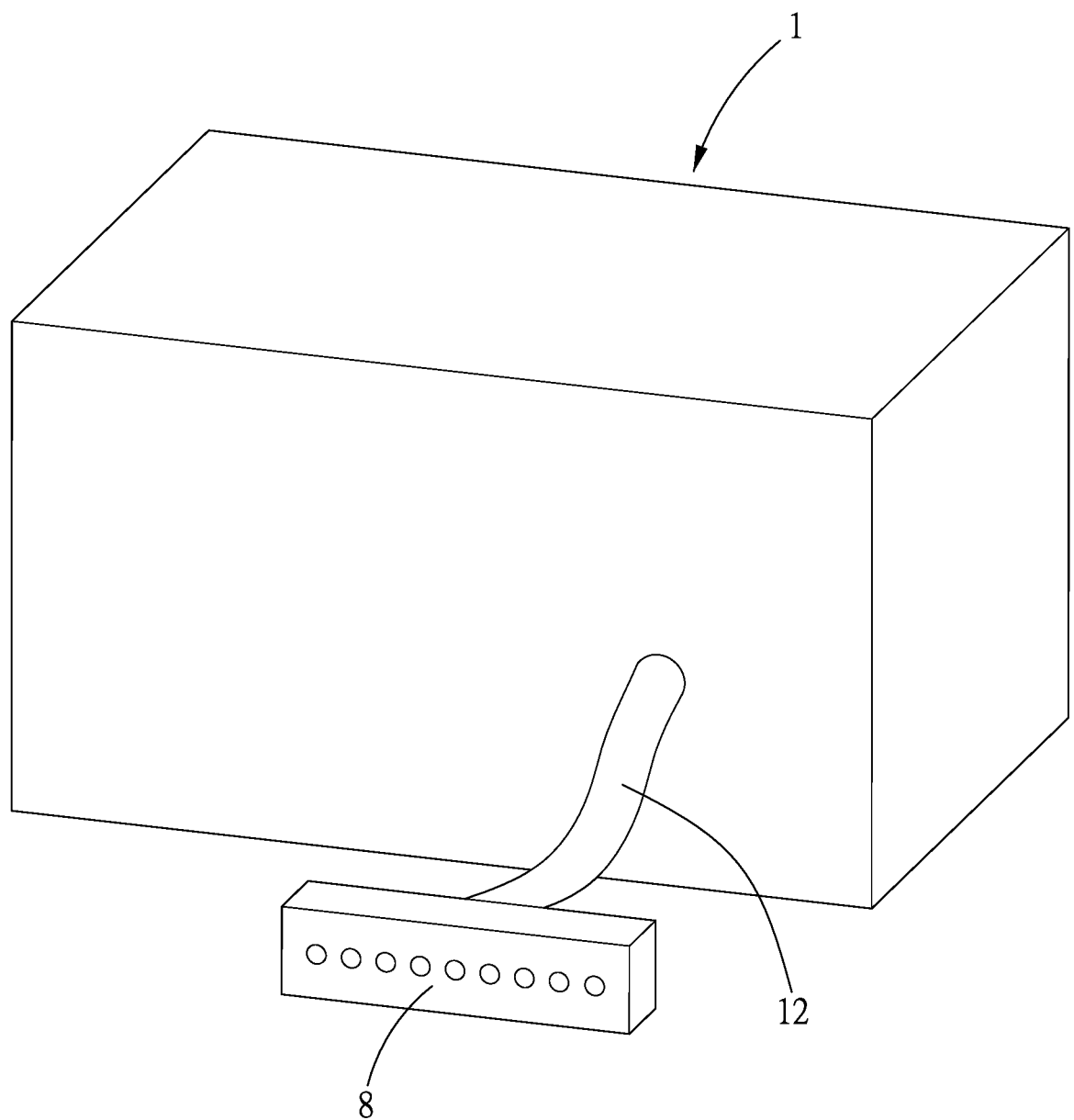
FIG. 7 is a perspective view of the alternate design of the preferred embodiment of the present invention, showing the external connector extending out of the case through the cable.
Figure 8:
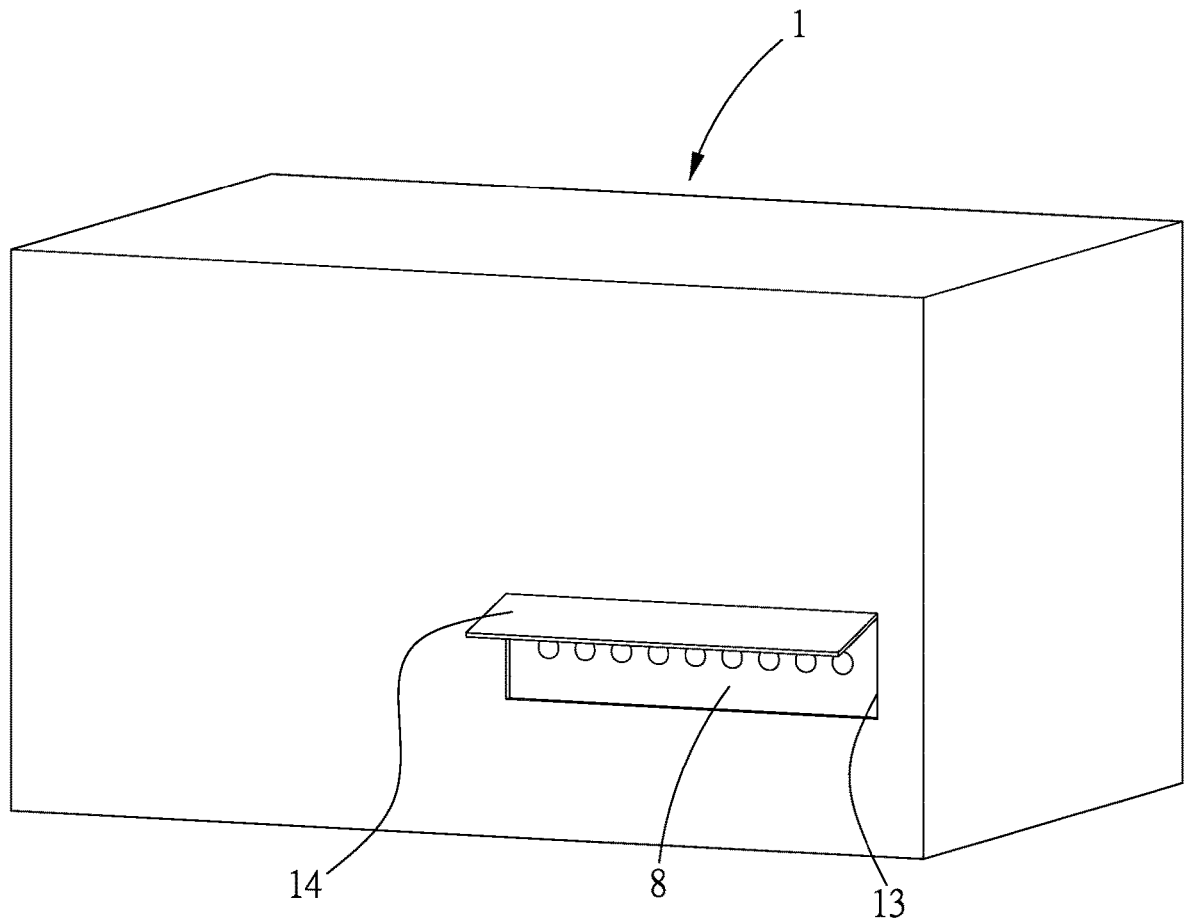
FIG. 8 is a perspective view of another alternate design of the preferred embodiment of the present invention, showing the case with a lid to cover the external connector.
Figure 9:
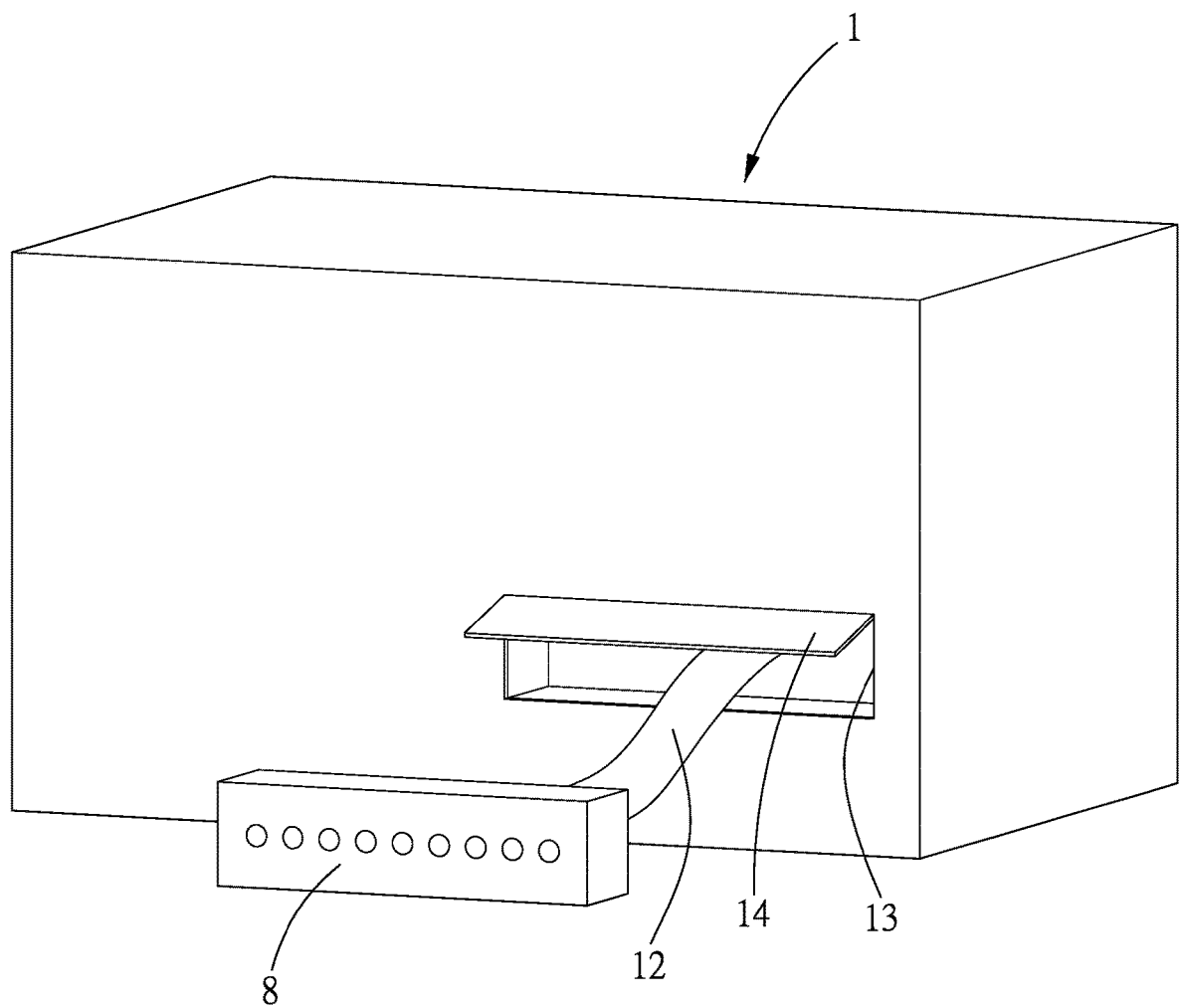
FIG. 9 is a perspective view of the third alternate design of the preferred embodiment of the present invention, showing the case with a lid and the external connector with a cable.

As shown in FIG. 6, the external connector 8 is mounted on a case of the battery 1, and the case is provided with a detachable lid 8a to cover the external connector 8 for waterproof and dustproof. FIG. 7 shows the external connector 8 has a cable 12 which makes the external connector extending out of the case of the battery 1. FIG. 8 shows the external connector 8 is mounted on the case of the battery 1, and a lid is pivoted on the case to cover the external connector 8. FIG. 9 shows the external connector 8 has a flexible cable 12. The case is pivoted with a lid 14 and a cavity 13 formed behind the lid 14. The external connector 8 is able to be received in the cavity 13 and then close the lid 14 for storage, or open the lid 14 and pull the external connector 8 out of the cavity 13 for use. The lid 12 serves waterproof and dustproof function, so that the external connector 8 may not have waterproof and dustproof function.

In some considerations, the external wires 8-0c to 8-8c may be electrically connected to the negative electrode 2-1a and the positive electrodes 2-1b to 2-8b without the junction terminal block 7. However, the junction terminal block 7 is helpful to connection and disconnection of the external terminals 8-0 to 8-8 and the negative electrode 2-1a and the positive electrodes 2-1b to 2-8b. it provides an easy way to assemble, disassemble, and repair the battery 1 of the present invention. Furthermore, it may be integrated in the circuit board of the BMS 4 to simplify the circuit of sampling the voltage.

As described above, the battery module for the electric vehicle usually has thousands of cells. These cells construct cell blocks, and the cell blocks are connected in series to form the battery module. The cells will have different statuses after predetermined times of charging and discharging, and that will decrease the performance of the battery.

In practice, a cell is fully charged for the first time, and recharged until the cell has 20% power remained. Usually, it is called 80% DOD (depth of discharge). With such operation, it will take ten years that the cell will have 80% performance than the new cell. In average, the performance of the cell decreases 0.167% per month, and decreases 2% per year. However, when the cells are connected to form a battery module, the total performance of battery module decreases larger than the cells because of the variation of the cells. In practice, the performance of the battery module will decrease 1% (including 0.167% decrease of the cells) after 60 times of charge/discharge in a month. Therefore, it will have 12% decrease ((including 2% decrease of the cells) every year. The performance of the battery module will be less than 80% after two years. The only way to fix this problem is balance charging and discharging the cell blocks. However, the conventional way of balance charging and discharging the cell blocks is not easy.

The present invention provides the external connector which make the balance charging and discharging task easier to recover the battery module in an easy way. If a battery module is operated for balance charging and discharging task every one to three months, it will have 2% decrease per year (the decrease caused by the variation of the cells is eliminated) to elongate the life of the battery module. Therefore, the present invention provides the external connector which electrically connects the electrodes of the cell block inside to make the balance charging and discharging task easier than the conventional way.

If a battery module is charged with the BMS, the BMS will stop the charging task when a difference of the voltage of any two if the cells is larger than 0.3V. In our invention, all the cells are directly charged through the external connector, so that the charging task will be stop only when the cells are fully charged even there is a cell with 0 voltage.

In practice, the battery module is charged with a large constant current until at least one cell block is full (or reach a predetermined voltage), and then charged with a constant voltage until the current is lower to a predetermined value. In this condition, usually there is only one cell block being fully charged since the cell blocks of the battery module are different. For rest of the cell blocks they only are nearly full or reach a voltage that can be called full. Next the battery module is connected to a charger through the external connector to charge the cell blocks individually until all the cell blocks are fully charged or all of them have the same voltage to make sure all the cell blocks have the same condition. In conclusion, the present invention may charge the battery module with a large current to shorten the charging time.

The present invention allows to monitor a temperature inside the battery module through the testing member 3-1t to 3-4t and the junction terminal blocks 7. However, the vehicle is stopped when the battery module is charged with the method of the present invention, so the battery module usually does not have the temperature problem in the time of charging with the method of the present invention.

It must be pointed out that the embodiments described above are only some preferred embodiments of the present invention. All equivalent structures which employ the concepts disclosed in this specification and the appended claims should fall within the scope of the present invention.

What is claimed is:

1. A battery, comprising:
   a case;
   a battery module having a plurality of cell blocks received in the case and electrically connected in series, and each of the cell blocks has electrodes;
   a battery management system received in the case and electrically connected to the battery module;
   a junction terminal block received in the case, wherein the junction terminal block has a plurality of junction terminals to be electrically connected to the electrodes of the cell blocks through a plurality of junction wires respectively; and
   an external connector having a plurality of external terminals to be electrically connected to the junction terminals of the junction terminal block through a plurality of external wires;
   wherein the external terminals of the external connector are electrically connected to the cell blocks through the external wires, the junction terminals of the junction terminal block and the junction wires respectively, so that all the cell blocks are able to be charged individually through the external connector.

2. The battery of claim 1, wherein each of the junction terminals of the junction terminal block has a fastener and a conductive pad; an end of the junction wire and an end of the external wire are electrically connected to the same conductive pad and fixed by the same fastener.

3. The battery of claim 1, wherein the external connector is mounted on the case.

4. The battery of claim 1, wherein the external connector extends out of the case through a cable.

5. The battery of claim 3, wherein the case is provided with a lid and a cavity formed behind the lid; the external connector is received in the cavity, and the lid is closed to cover the external connector.

6. The battery of claim 2, wherein a number of the junction terminals and a number of the external terminals are at least one more than that of the cell blocks.

7. The battery of claim 1, wherein the junction terminal block has a circuit board and a junction terminal socket mounted on the circuit board and electrically connected to a circuit of the circuit board; the junction terminal socket has a plurality of holes and conductive pads received in the holes respectively; a plurality of conductive plates are mounted on the circuit board and electrically connected to the conductive pads respectively; the junction terminal block is received in the case independently.

8. The battery of claim 7, wherein the external connector is mounted on the case.

9. The battery of claim 7, wherein the external connector extends out of the case through a cable.

10. The battery of claim 7, wherein the case is provided with a lid and a cavity formed behind the lid; the external connector is received in the cavity, and the lid is closed to cover the external connector.

11. The battery of claim 7, wherein the external wires of the external connector each has a pin plug on an end thereof, and each of the pin plug has pins; the pins of the pin plugs are inserted into the holes of the junction terminal socket to electrically connect the external connector to the junction terminal block.

12. The battery of claim 1, wherein the junction terminal block has circuit board and a junction terminal socket mounted on the circuit board and electrically connected to a circuit of the circuit board; the junction terminal socket has a plurality of holes and conductive pads received in the holes respectively; a plurality of conductive plates are mounted on the circuit board and electrically connected to the conductive pads respectively; the circuit board of the junction terminal block is integrated in a circuit board of the battery management system.

13. The battery of claim 12, wherein the external connector is mounted on the case.

14. The battery of claim 12, wherein the external connector extends out of the case through a cable.

15. The battery of claim 12, wherein the case is provided with a lid and a cavity formed behind the lid; the external connector is received in the cavity, and the lid is closed to cover the external connector.

16. The battery of claim 12, wherein the external wires of the external connector each has a pin plug on an end thereof, and each of the pin plug has pins; the pins of the pin plugs are inserted into the holes of the junction terminal socket to electrically connect the external connector to the junction terminal block.

* * * * *